Figure 1:
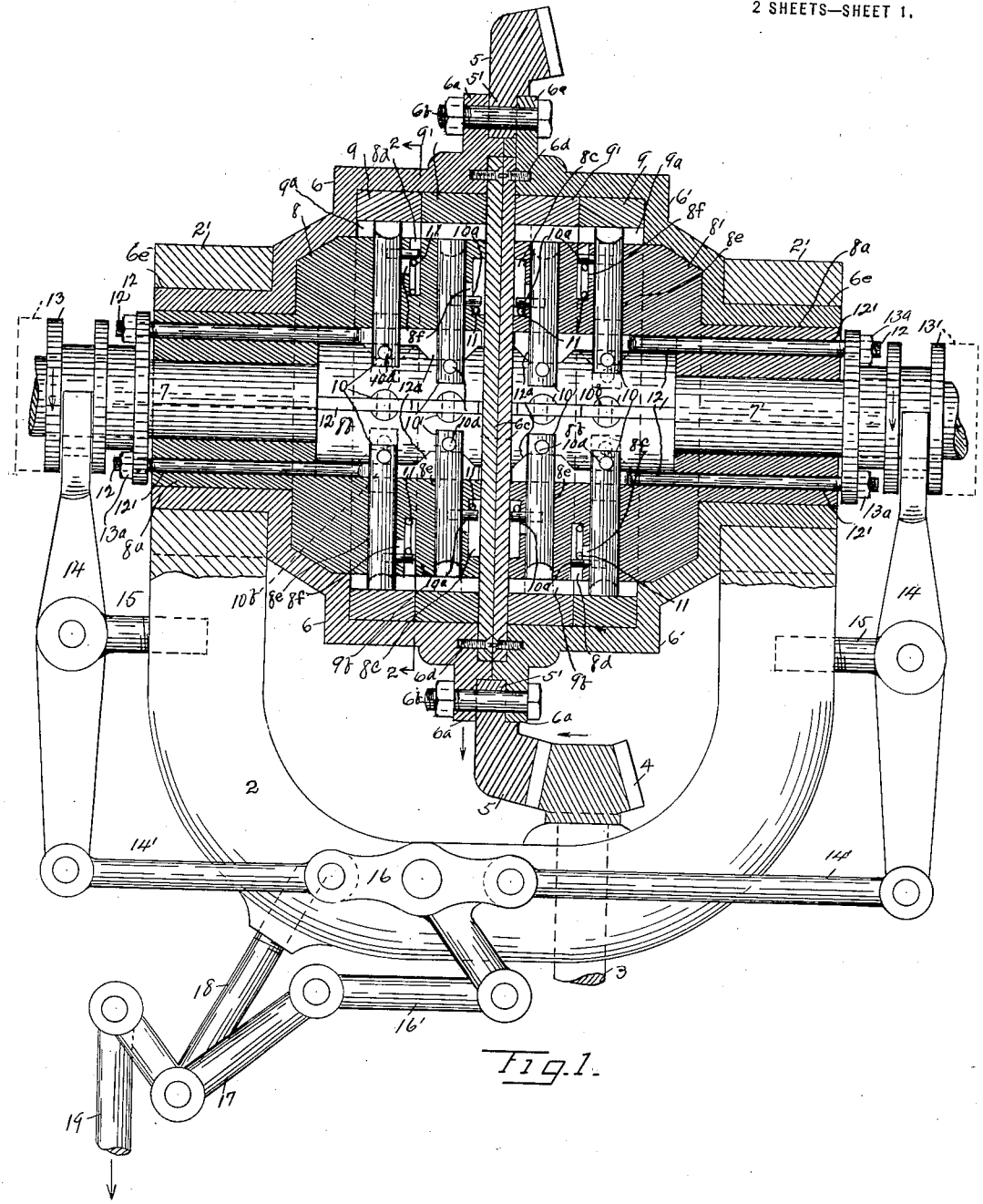

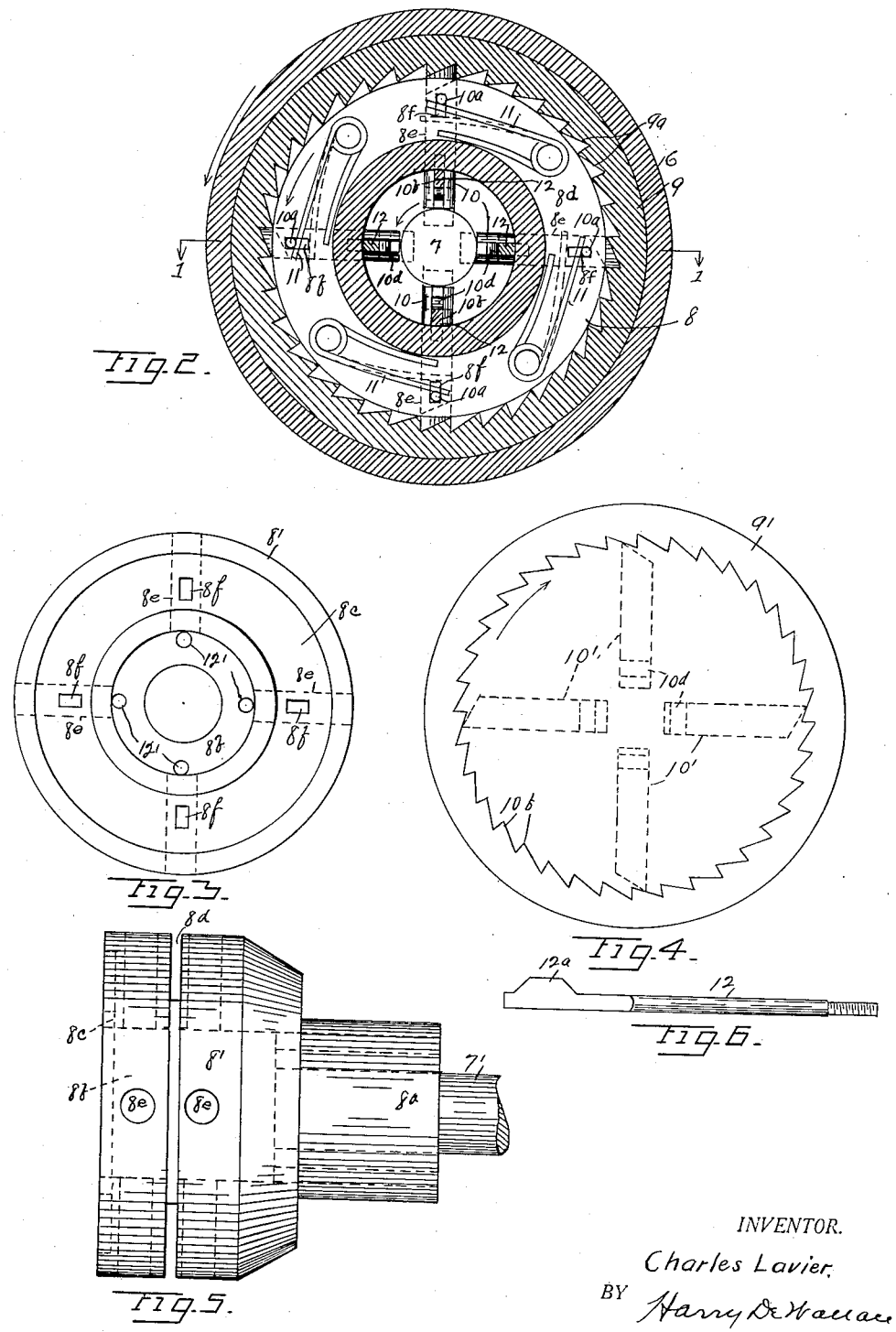

UNITED STATES PATENT OFFICE.

CHARLES LAVIER, OF SYRACUSE, NEW YORK.

GEARLESS DIFFERENTIAL.

1,337,460.

Specification of Letters Patent.　　Patented Apr. 20, 1920.

Application filed November 6, 1919. Serial No. 335,989.

*To all whom it may concern:*

Be it known that I, CHARLES LAVIER, a citizen of the United States, residing at Syracuse, in the county of Onondaga and State of New York, have invented certain new and useful Improvements in Gearless Differentials, of which the following is a specification.

This invention relates to gearless differentials, designed for driving the two-part rear axles of automobiles, tractors, and the like, and has for its object to provide novel and simple forward and backward driving members, which are constantly in direct connection with the usual bevel gears commonly actuated by the motive power. A further object is to provide a powerful clutch or ratchet mechanism, in duplicate parts, for driving the vehicle forwardly, and a similar mechanism for driving the vehicle backwardly, both of said mechanisms being so arranged that either of the rear axles of the vehicle may rotate faster than the other when the vehicle is rounding curves, at which times the slower moving axle alone is being driven by the power of the main shaft of the vehicle. A further object is to provide novel and simple means preferably controlled by the movements of the gear-shifting lever, for shifting the ratchet driving parts for effecting the forward and backward operations of the vehicle. And a further object is to provide a gearless differential which positively drives both of the rear axles of the vehicle, while the latter is moving substantially in a straight or direct course.

I attain these objects by the means set forth in the detailed description which follows, and as illustrated by the accompanying drawings, in which—

Figure 1 is a central horizontal section, substantially on line 1—1 of Fig. 2. Fig. 2 is a vertical cross-section, taken on line 2—2 of Fig. 1. Fig. 3 is an end elevation of one of the sleeves carried by the rear axles, and which supports one of each set of ratchet dogs. Fig. 4 is a side view of one of the backward driving ratchet wheels. Fig. 5 is a side elevation of the sleeve shown in Fig. 3. And Fig. 6 is a side view of one of the dog-releasing members.

In the drawing, 2 represents a horse-shoe shaped bracket, the arms of which support the differential and related mechanisms, as well as the means employed for shifting the ratchet drives. 3 is the usual engine-driven main shaft, on the rear end of which is mounted a bevel pinion 4, the latter meshing and driving a larger bevel gear 5. The gear 5 is in the form of a ring, having a relatively narrow annular web 5', which is disposed between and rigidly held by abutting flanges 6ª of similar bell-shaped casings 6 and 6', the said casings being arranged axially and held together by bolts 6ᵇ, which also pierce the web of the gear 5. The enlarged open ends of the casings are preferably closed by circular plates 6ᶜ, which are held in place by screws 6ᵈ. The reduced ends of the casings comprise hollow journals 6ᵉ, which have their bearings in the arms 2' of the bracket 2. 7 and 7' represent the usual alining divided axles of the vehicle, the inner ends of which extend through the bearings 2', and are partially inserted into sleeves 8 and 8', which are rigid with the axles. The outer ends 8ª of the sleeves are reduced and comprise journals which have their bearings in the hubs 6ᵉ of the casings, and may rotate independently of the casings, when either wheel of the vehicle rotates faster than the casings. The sleeves 8—8' beyond the ends of the axles are enlarged, and their bores are correspondingly increased to provide relatively large chambers 8ᵇ. The inner ends of the sleeves 8—8' are provided with annular recesses 8ᶜ, which face the disks 6ᶜ. Each sleeve is also provided with a circumferential groove 8ᵈ. 9 and 9' represent similar internal ratchet gears, which are preferably driven rigidly into the larger bores of the casings 6—6'. The ratchets 9 have their teeth 9ª arranged as shown in Fig. 2; while the teeth of the ratchets 9' are arranged as shown in Fig. 4. The ratchets 9 are employed for driving the sleeves 8—8' and the corresponding axles in the direction for moving the vehicle forwardly; while the ratchets 9' are employed for driving the vehicle backwardly. The driving of the sleeves 8—8' by the ratchets 9—9', is accomplished by means of a plurality of cylindrical dogs 10 and 10', there preferably being four of said dogs for each of said ratchets. The dogs are reciprocably disposed in radial perforations 8ᵉ of the two sleeves, and each dog is forced and held in engagement with the teeth of the corresponding ratchet gear by means of a spring 11, as best seen in Fig. 2. The springs for the dogs 10 are disposed in the circumferential grooves 8$^d$; while the springs for the dogs 10' are disposed in the recesses 8$^c$. Each of the dogs is provided with a pin 10$^a$, which projects through a slot 8$^t$ in the sleeve, and is engaged by the corresponding spring 11. The springs 11 only operate the dogs toward the ratchets 9—9', and they resiliently hold the outer ends of the dogs in the teeth of the ratchets, and allow the said dogs to yield and skip from tooth to tooth, when the corresponding vehicle wheel travels faster than the other, as when the vehicle is rounding a curve. For releasing and holding the dogs out of mesh with the ratchet gears, I provide a plurality of reciprocating rods 12, the said rods being disposed in holes 12', which are drilled longitudinally through the reduced ends of the sleeves 8—8', parallel to the axles. The inner ends of these rods pass through slots 10$^b$ in the free ends of the dogs, and each of said rods is provided with a wedge-like projection or cam 12$^a$ which engages pins 10$^d$ carried by the dogs. Each rod 12 passes through two dogs (10 and 10'), but the wedges 12$^a$ are arranged to shift only one dog at a time, so that when the dogs 10 are in driving engagement with the ratchets 9, the dogs 10' are held out of engagement with the ratchets 9', and vice versa. The outer ends of the shift-rods 12 are threaded and connect to clutch-sleeves 13—13', and are held in place by nuts 13$^a$. The clutches 13 are slidably mounted on the axles 7—7', and are reciprocated by yoked levers 14, which are pivoted by posts 15 to the arms of the bracket 2 (see Fig. 1). The levers 14 are connected with a double crank 16 by rods 14', and the crank 16 is connected to a bell-crank 17 by a rod 16'. The bell-crank 17 is pivotally supported by a post 18, which is screwed into the bracket 2. The bell-crank 17 is operated by a rod 19 through suitable connections (not shown) with the usual gear-reversing lever, which is manipulated by the driver of the vehicle. By this disposition and arrangement of the parts, the driver of the car when operating his gear-shifting lever for driving the vehicle forward and backward, simultaneously effects the shifting of the dogs 10 and 10', without requiring a separate lever for operating the latter.

The operation of my gearless differential is as follows: Assuming that the vehicle is to be driven forwardly, the driver sets his gear-shifting lever (not shown) in the proper position for the said direction. This automatically sets the differential mechanism in the position shown in Figs. 1 and 2, wherein the dogs 10 are in mesh with the teeth of the ratchet gears 9. The engine when started rotates the bevel gear 5 and the casing 6—6' in the direction indicated by the arrows in Figs. 1 and 2. The gear 5, the casing 6—6', and all of the ratchet gears 9—9' are then rotated as one part, and the dogs 10 carried by the sleeves 8—8', being in mesh with the gears 9, effect the driving of the said sleeves and the axles 7—7' in the direction for moving the vehicle ahead. As long as the vehicle maintains a straight or direct course, both sets of the dogs 10 remain in positive engagement with the ratchet gears 9, and the driving power is equally applied to both of the rear axles. In case the vehicle curves toward the right, for example, the axle 7' will be rotated faster than the axle 7, due to the greater distance the left wheel must travel in rounding the curve. As the speed of the wheel which is traveling in the greater arc increases above the speed of the slower wheel, the dogs 10 carried by the sleeve 8' skip over the teeth of the corresponding ratchets 9, as shown by the dotted lines in Fig. 4. Thus, in rounding curves, the driving power is applied only to the slower moving wheel, and this condition will continue until the vehicle again enters a straight course. As soon as this takes place, the distance to be traveled by the two wheels being equal, all of the dogs 10 become stationary relatively to the ratchets, and all receive and impart an equal proportion of the driving power. When the the time comes, to reverse the direction of travel of the vehicle, the driver operates his gear-shifting lever in the opposite direction, and this automatically throws the clutches 13 outwardly away from the differential (see dotted lines in Fig. 1), and correspondingly moves the rods 12 in the direction for the wedges 12$^a$ to release the dogs 10', and at the same time to withdraw the dogs 10 (see dotted lines in Figs. 1 and 2). As soon as the dogs 10' are free from the wedge 12$^a$, the springs 11 instantly force the said dogs outwardly and into mesh with the ratchet gears 9', whose teeth are arranged for driving the vehicle in the opposite, or backward direction, as described.

Having thus described my invention, what I claim as new and desire to secure by Letters Patent, is—

1. A differential mechanism, including divided axles, a casing supporting said axles, sleeves mounted on the inner ends of the axles and journaled in said casing, said sleeves having radial perforations, duplicate internal ratchet gears for driving a vehicle forward rigid with said casing, duplicate internal ratchet gears for driving the vehicle backward also rigid in said casing, one of each set of ratchet gears encircling each sleeve and registering with the corresponding perforations, dogs reciprocable in the perforations of each sleeve adapted to operatively connect said ratchet gears with said sleeves, tension means for moving said dogs toward said gears, and a plurality of rods for alternately moving the dogs away from the forward and backward driving ratchet gears.

2. The combination with the power driven shaft of a motor vehicle and a pair of bevel gears operated by said shaft, of a two-part casing driven by one of said bevel gears, alining divided axles, sleeves mounted on the inner ends of said axles inclosed and journaled in the corresponding parts of said casing, said sleeves having a plurality of radial perforations, internal ratchet gears rigid in both parts of said casing and encircling the perforated portions of said sleeves, two of said ratchet gears arranged for driving said sleeves in one direction, and two of said ratchet gears arranged for driving said sleeves in the opposite direction, radially movable dogs disposed in said perforations adapted to alternately engage the different ratchet gears, and means for shifting said dogs.

3. The combination with the main driving shaft of a vehicle and a pair of bevel gears adapted to be driven by said shaft in different directions, of a casing rotatable with one of said gears, a pair of forwardly driving ratchet gears movable with said casing, a pair of backwardly driving ratchet gears also movable with said casing, alining axles, sleeves mounted on the inner ends of said axles and journaled in said casing, dogs for operatively connecting said ratchet gears with said sleeves, said dogs arranged in sets and movable radially toward and from said gears, means for withholding one set of dogs from the corresponding ratchet gears, while the vehicle is being driven by the other ratchet gears, and vice versa, and means for permitting the dogs of one sleeve to skip over the teeth of the corresponding ratchet gear when one vehicle wheel travels faster than the other in rounding a curve, and tension means for resiliently holding all of said dogs in contact with said ratchet gears.

4. A differential mechanism, including divided axles, a casing rotatable in opposite directions by the motive power of a vehicle, sleeves journaled in the opposite ends of the casing and supporting and driving said axles, internal ratchet gears rigid in said casing and encircling said sleeves adapted to drive said sleeves and said axles in opposite directions, radially movable dogs carried by each sleeve adapted to alternately connect the corresponding ratchet gears with said sleeve, means for shifting said dogs for effecting the driving of the vehicle in the same direction as said casing, and means for allowing one axle and its sleeve to rotate faster than said casing.

5. A differential mechanism, including divided axles, sleeves rigidly mounted on the inner ends of said axles, a casing rotatable in opposite directions by the motive power of a vehicle, said casing inclosing and affording bearings for said sleeves, internal ratchet gears rigid in said casing, two of said ratchet gears encircling each of said sleeves and adapted to drive said sleeves in opposite directions, a plurality of ratchet dogs carried by each sleeve and movable radially toward and away from said ratchet gears, and means for simultaneously shifting the dogs of both sleeves for permitting the casing to drive said sleeves and said axles at the same speed and in directions corresponding to the movements of said casing.

6. A differential mechanism, including divided axles, sleeves mounted on the inner ends of said axles, reciprocating dogs carried by said sleeves and disposed and movable radially, a split casing inclosing said sleeves adapted to be rotated by the motive power of a vehicle in opposite directions, internal ratchet gears carried by each part of said casing and encircling said sleeves in the path of said dogs, springs for forcing and resiliently holding said dogs in engagement with the teeth of said ratchet gears, and means for withdrawing and holding certain of said dogs free from the ratchet gears while the other dogs are being driven by said ratchet gears.

7. A differential mechanism, including a rotatable casing comprising two parts joined axially, a pair of internal ratchet gears carried by each part of said casing, pair of alining axles, sleeves mounted on the inner ends of the axles, said sleeves journaled in the corresponding parts of said casing, a plurality of dogs arranged in similar sets carried by each sleeve, said dogs being disposed radially and movable into and out of engagement with said ratchet gears, springs for moving said dogs toward said ratchet gears, and wedge devices for moving and holding said dogs away from said ratchet gears.

8. A differential mechanism, including divided axles, sleeves rigid on the inner ends of said axles and having radial perforations, a casing rotatable in opposite directions by the power of a motor vehicle, said casing inclosing said sleeves, a pair of internal ratchet gears rigid in said casing concentric to each of said sleeves, one ratchet gear of each pair adapted to drive the corresponding sleeve and axle forwardly, the other ratchet gear of the pair adapted to drive the sleeve and its axle backwardly, each of said ratchet gears disposed in the path of one series of the perforations, reciprocating radially movable dogs disposed in said perforations, tension means for moving said dogs outwardly into the teeth of said ratchet gears, and a series of cams for alternately withdrawing the several series of dogs from engagement with the ratchet gears.

9. In a differential mechanism, a casing rotatable in opposite directions by the motive power of a vehicle, divided driving axles, sleeves rigid on said axles and journaled in said casing, internal ratchet gears rigid with said casing, two of said gears encircling each sleeve, the teeth of said ratchet gears pitched in opposite directions for driving said sleeves forwardly and backwardly, and a plurality of dogs carried by each sleeve and disposed in the paths of said ratchet gears, said dogs adapted to operatively connect first one ratchet gear and then the other ratchet gear with the corresponding sleeve for driving said axles in opposite directions corresponding to the movement of said casing.

10. In a differential mechanism, a casing rotatable in opposite directions, separated axles, sleeves rigid on the axles, said sleeves inclosed and journaled in said casing, internal ratchet gears rigid with said casing, two of said gears encircling each sleeve, and having their teeth arranged for driving the sleeves in opposite directions, a set of dogs carried by each sleeve for each of said ratchet gears, tension means for forcing and holding said dogs in engagement with the ratchet gears, and means for forcing and holding one set of dogs away from the ratchet gears, while the other set of dogs is in the driving position.

11. In a differential mechanism for vehicles, a pair of alining axles, a casing rotatable in opposite directions by the power of the vehicle, sleeves journaled in the casing and rigidly connected to said axles, radially movable dogs carried by said sleeves, said dogs arranged in series, a plurality of internal ratchet gears rigid in said casing and encircling said sleeves in the paths of the several series of dogs, means for forcing one series of dogs of each sleeve into engagement with the corresponding ratchet gears for driving the vehicle in one direction while the other dogs are held out of engagement with the other ratchet gears, and means for reversing all of said dogs for effecting the driving of the vehicle in the opposite direction.

12. In a differential mechanism, divided axles, a casing adapted to be driven in opposite directions by the motive power of a vehicle, sleeves rigid on said axles and journaled in said casing, a forward driving ratchet gear encircling each sleeve, a backward driving ratchet gear also surrounding each sleeve, radially movable dogs carried by each sleeve and arranged in series, one series for each ratchet gear, means for connecting the corresponding dogs with the forward driving ratchet gears while the other dogs are held in the idle position, and means for shifting all of said dogs for effecting the backward driving of the axles.

13. In a differential mechanism, the combination with the power-driven shaft of a motor vehicle, and a pair of bevel gears driven by said shaft, of a two-part casing clamping one of said gears therebetween and rotated by said gear, alining separate axles inserted part-way into the ends of said casing, sleeves rigid on the inner ends of said axles and journaled in said casing adapted for rotation independent of said casing, a pair of internal ratchet wheels rigid in each part of said casing, one wheel of each pair adapted for driving said axles forwardly, the other wheels adapted for driving the axles backwardly, means for allowing one of said axles to rotate faster than the other axle, a set of dogs for each ratchet wheel, said dogs supported by said sleeves and movable radially toward and from said wheels, springs for resiliently holding said dogs in engagement with the ratchet wheels, a plurality of rods movable longitudinally in each of said sleeves adapted for alternately disconnecting the different sets of dogs from the corresponding ratchet wheels, clutch-sleeves carried by said axles for reciprocating said rods, and means for operating said clutch-sleeves.

In testimony whereof I affix my signature.

CHARLES LAVIER.